United States Patent [19]

Capodicasa

[11] Patent Number: 4,706,560
[45] Date of Patent: Nov. 17, 1987

[54] REFUSE TREATMENT APPARATUS

[76] Inventor: Gaetano Capodicasa, Via Torrenuova,23, 97100 Ragusa, Italy

[21] Appl. No.: 829,399

[22] Filed: Feb. 13, 1986

[30] Foreign Application Priority Data

Feb. 21, 1985 [IT] Italy .............................. 19590 A/85

[51] Int. Cl.[4] ............................................. B30B 15/34
[52] U.S. Cl. ............................ 100/102; 100/229 A; 100/215; 100/93 R; 100/116; 100/249; 110/223
[58] Field of Search ............... 100/102, 229 A, 215, 100/93 P, 110, 116, 249, 90, 91; 53/529; 110/223; 55/244, 245

[56] References Cited

U.S. PATENT DOCUMENTS

| 2,817,290 | 12/1957 | Parker | 100/102 |
| 2,961,977 | 11/1960 | Coleman | 100/102 X |
| 3,815,332 | 6/1974 | Bobrowsky | 55/244 |
| 3,881,408 | 5/1975 | Valor | 100/229 A X |
| 4,008,658 | 2/1977 | Stock | 100/229 A X |
| 4,036,152 | 7/1977 | Bright | 100/229 A X |
| 4,044,664 | 8/1977 | Budoff | 100/229 A X |
| 4,273,037 | 6/1981 | Ruebesam | 100/229 A X |

FOREIGN PATENT DOCUMENTS

| 0105862 | 4/1984 | European Pat. Off. | 100/229 A |
| 2457944 | 1/1981 | France | 100/249 |

Primary Examiner—Peter Feldman
Attorney, Agent, or Firm—Bucknam and Archer

[57] ABSTRACT

Apparatus for the treatment of domestic refuse to convert it into a solid odorless and non putrefiable residue of reduced weight and volume, comprises a sealable casing housing a process cylinder provided with means for compacting refuse introduced therein, and heater means for raising the temperature within the process cylinder to a level such as to vaporize any liquids contained in the refuse, the casing also housing extractor means for removing vapors, gases and fumes generated upon incineration of the refuse, and being provided with an upper door for the introduction of domestic refuse, and a lower door for the withdrawal of residues obtained after treatment.

2 Claims, 2 Drawing Figures

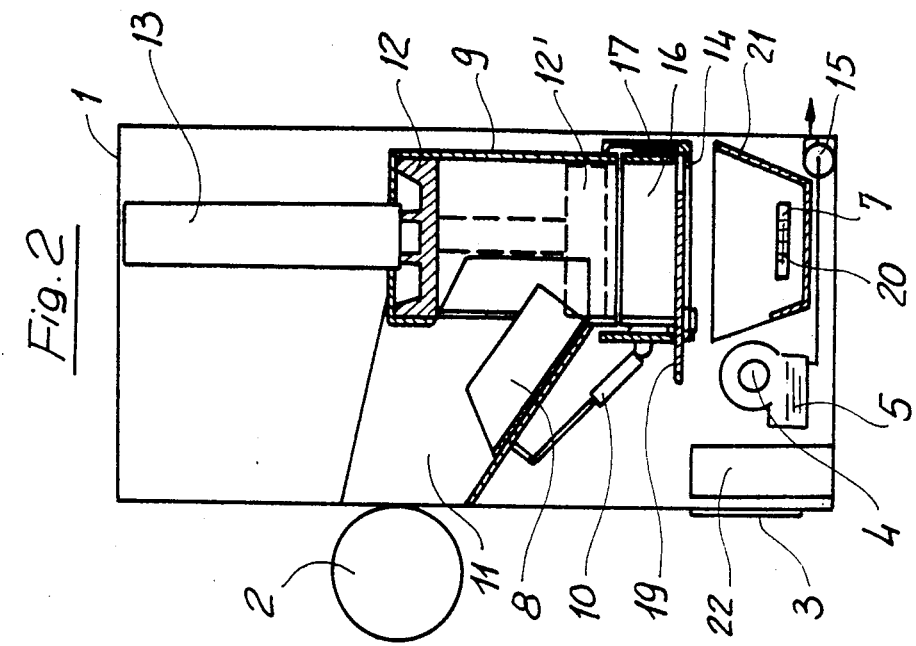
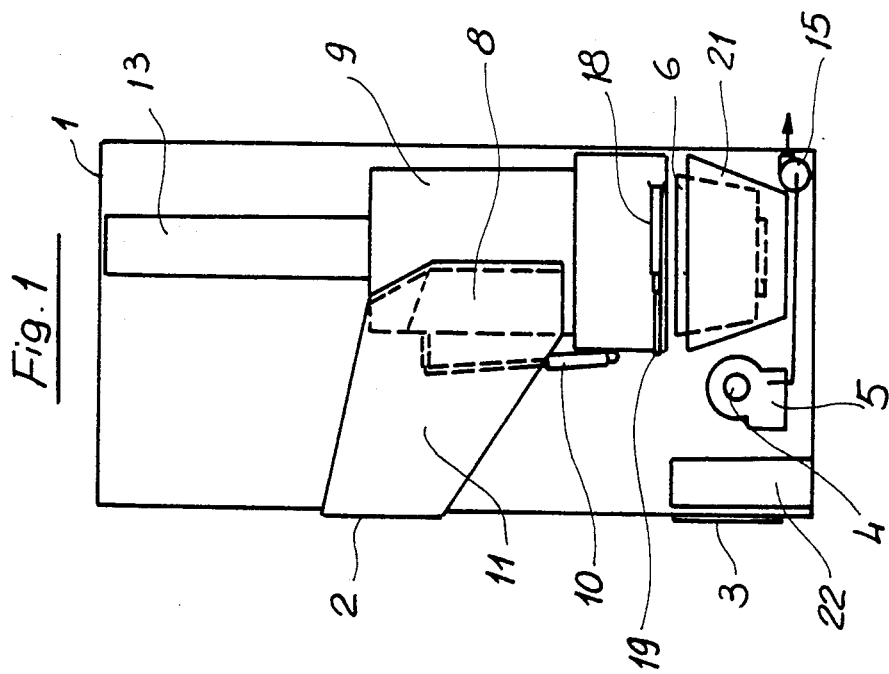

REFUSE TREATMENT APPARATUS

BACKGROUND OF THE INVENTION

The present invention relates to apparatus for the treatment of refuse and is particularly suited for domestic use or for a community. The present invention is particularly designed to simplify and resolve the numerous and varied problems of space, economy and, above all, sanitary facilities relating to the collection, transport and destruction of solid domestic refuse.

As is known, domestic refuse normally has characteristics which make storage difficult in practice, both in the home and in the community, before removal by those who have the responsibility of performing this task. These characteristics are: a rapid deterioration and a considerable bulk, this latter because of the various boxes, receptacles and casings usually present in large numbers.

These characteristics make it necessary at present to have a relatively large volume of space for depositing the refuse and also a prompt and frequent collection; however, these are not always readily available.

At the domestic level, this problem has been the subject of much thought and can be partially resolved with the use of a waste disposal device in the form of a grinding device which can be fitted to the drainage system of the kitchen sink; however, such grinding devices have not been widely accepted by consumers, both because of the cost and because the grinders cannot dispose of refuse containing metals, glass, ceramics, cardboard, fabrics and plastics, and, above all, because such waste disposal units can create considerable disadvantages in the waste pipes which are not always suitable for this purpose.

At the community level, there have often been adopted systems of refuse collection in plastic sacks; the deterioration problem is mitigated, if not overcome, with the adoption of closable plastic sacks and large closable containers which are located in urban streets or at the entrances to buildings for larger scale collections. Likewise, the adoption of more or less sealed transport lorries which slightly compact the refuse has gone some way toward dealing with the problem.

In the field of distribution of collected refuse experiments are still being performed to find the best solutions, which may or may not involve the utilisation of one or more of these above mentioned arrangements

OBJECTS OF THE INVENTION

A primary object of the present invention is to provide apparatus suitable for domestic use, for the treatment of refuse, which allows solid domestic refuse to be transformed into a solid odourless and non putrefiable residue of reduced weight and volume.

Another object of the invention is to provide refuse treatment apparatus which is safe and convenient to use, and by means of which it is possible to produce hygienic, compact sealed containers of domestic refuse for subsequent collection and disposal.

Another object of the invention is to provide refuse treatment apparatus capable of treating domestic refuse so that it can subsequently be stored for longer periods without putrefaction or decay, and in a smaller space, whilst at the same time allowing the frequency of collection to be reduced (that is a longer interval between successive collections).

SUMMARY OF THE INVENTION

According to the present invention apparatus for the treatment of domestic refuse to convert it into a solid odourless and non putrefiable residue of reduced weight and volume, is characterized in that it comprises a sealable casing housing a process cylinder provided with means for compacting refuse introduced therein, and heater means for raising the temperature within the process cylinder to a level such as to vaporise any liquids contained in the refuse, the casing also housing extractor means for removing vapours, gases and fumes generated upon incineration of the refuse, and being provided with an upper door for the introduction of domestic refuse, and a lower door for the withdrawal of residues obtained after treatment.

Embodiments of the present invention offer the advantage of eliminating the smells and putrefaction of refuse, as well as a reduction of the bulk of the refuse, in practice, to the weight and volume of any solid metal, glass and ceramic materials present therein, after almost complete elimination of the empty spaces between them.

Other features and advantages of the invention will become clear from a study of the following detailed description with reference to the accompanying drawings, which is provided purely by way of non-limitative example.

BRIEF DESCRIPTION OF THE DRAWINGS

FIG. 1 is a schematic side view of the apparatus, with the outer casing sectioned so as to show processing cylinder which is in the closed position; and FIG. 2 is a schematic side view of the apparatus, again with the outer casing sectioned to show the interior of the apparatus, with the processing cylinder shown in section and in an open position ready to receive solid domestic refuse to be treated.

DESCRIPTION OF THE PREFERRED EMBODIMENT

Referring now to the drawings, it will be seen that the apparatus for treatment of solid domestic refuse, which can be formed preferably as a unit of furniture to be fitted between normal kitchen furniture units, has an outer casing 1 provided with a suitable control panel, with an upper loading door 2 and a lower emptying door 3. Within the casing 1 there is an upright metal process cylinder 9, closed at its upper end by a piston 12 of suitably regulated stroke, and, at its lower end by a shutter 19, movable by an actuator 18. In an alternative embodiment (not shown) the shutter 19 may be replaced with a lower piston acting upwardly from the bottom of the cylinder 9. The cylinder 9, the piston 12 and the shutter 19 (and the lower piston if there is one) can be made of any suitable material and actuated by any type of control, manual or otherwise.

The shutter 19 has apertures 14, and the cylinder 9, and piston 12 may likewise have suitable apertures (not shown) to allow the escape of liquids in the case in which it is desired to eliminate these during compression.

In the exemplary embodiment described here the lower part of the process cylinder 9 is formed as a furnace 16 and provided with a heater 17 connected to the electrical mains by connectors (not shown), and below the cylinder 9 is a bowl 21 connected to a pump 15 leading to the drainage network (as represented by the arrow in FIG. 2). The pump 15 is also connected to an extractor device 4 via a water filter 5 to facilitate the removal of liquids, as well as for cooling the fumes and condensing a part of the these) whereby to discharge, to the drainage network liquids, vapours, gases and fumes generated in use of the apparatus. The apparatus is also provided with the necessary control systems to allow the various operations which will be described below to be performed according to specific programmes. The outer casing 1 is sealed and the opening of the loading door 2 puts the extractor device 4 into operation which maintains the interior under vacuum and sends the withdrawn air (containing odours, vapours, gases and fumes) through a water filter 5 to the drainage network; this extractor is always in action when the apparatus is in any part of its operational cycle.

In this embodiment the apparatus is provided with preformed, hermetically sealable plastics containers 6 to receive the residues of solid refuse after treatment, and with a system 7 for washing the interior of the apparatus with water and detergent.

In use of the apparatus, solid refuse is introduced into a feeder 8 through the loading door 2; in this particular case the feeder 8 is constituted by a hinged portion of the wall of the process cylinder 9, which is moved by a fluid pressure actuator 10 and is assisted by the chute 11 which prevents any escape of refuse from the process cylinder during loading. Once refuse has been placed in the feeder 8 it is then introduced into the process cylinder 9 by extension of the actuator 10 to swing the hinged wall portion 8 to the closed position after which the piston 12, driven by the actuator 13, performs a downward stroke until a predetermined pressure is reached. This downward stroke of the piston has the purpose of breaking up any glass or ceramic materials in the refuse, and of crushing any boxes of cardboard or any wooden or metal objects, and at the same time expelling liquids from the refuse, which escapes through holes 14 in the shutter into the bowl 21 and is carried away by the pump 15. If desired clean water can also be introduced into the bowl 21 through the jet system 20 to flush or rinse the liquid residues from the bowl 21. In this way the volume of the refuse in the process cylinder is substantially reduced and a large proportion of the liquid content is expelled.

When a predetermined pressure has been reached, the piston 12 returns to the initial position and the actuator 10 retracts to open the feeder again ready to receive more refuse; this cycle is repeated as long as the compacted material does not exceed the volume of the furnace 16.

To initiate the calcination and incineration phase the piston 12 is stopped in a predetermined position 12' (indicated in broken outline in FIG. 2) and the electrical resistance heater 17 in the lower part of the process cylinder 9 is energised. The refuse is maintained for a certain time at a high temperature, preferably greater than 500° C., after which the only remains are the ashes of organic residues, and the original content of glass, ceramic and metal materials. After the heating period is over the heater 17, which is heat regulated, is de-energised and the piston 12 returns to the initial position. When the temperature within the furnace has fallen to a value less than 100° C. the piston 12 can perform a stroke to compact the refuse residues.

Finally, the actuator 18 is operated to open the shutter 19, and the piston 12 effects a complete stroke pushing the compacted and incinerated residue out of the process cylinder 9 into a preformed container 6 which has been positioned in the bowl 21 for this purpose. Several such operations can be performed in this way, and when the container 6 is full, the user can remove it through the lower door 3. The container 6 can then be sealed shut with a suitable sealing cover provided for this purpose.

At this point, if it is not desired to wash out the apparatus, a new container 6 can be introduced and the apparatus is ready for the initiation of a new cycle. On the other hand, if it is desired to wash out the apparatus between cycles, a detergent is introduced into the appropriate cassette, and an appropriate control actuated to put into operation the water jet device 20. In this phase, the feeder 8 is closed and shutter 19 open. The water, after having taken up the detergent, washes over the internal walls of the process cylinder 9 and falls into the bowl 21 from where it is sent to the drainage network by the pump 15.

Immediately afterwards, the heater 17 is energised to raise the interior temperature up to 100° C. to dry the apparatus, after which, with a new container 6 located in the bowl 21, the apparatus is ready for the initiation of a new cycle.

It is suitable to note that, in the above described exemplary embodiment of the apparatus of the invention, all the controls and monitoring are electrical and the operations involving force are performed hydraulically: for this purpose the apparatus is provided with a suitable hydraulic central control unit 22 and the actuators 13, 10, 18 are hydraulic rams.

If it is not desired to extract liquids from the solid domestic refuse before calcination, these will be eliminated as vapours during the heating: it will not, therefore, be necessary to connect the apparatus to the mains water network and to the drainage network, in that it will be the extractor fan 4 which will send vapours, gases and fumes into the atmosphere through a suitable chimney (not shown provided with a filter.

From the drawing, and from what has been explained above, it is easy to discern the significant practical, economic and functional values which characterise the apparatus for the treatment of solid domestic refuse, which forms the subject of the present invention.

What is claimed is:

1. Apparatus for the treatment of domestic refuse operating to convert said refuse into a solid, odourless and non putrefiable residue of reduced weight and volume, said apparatus comprising:
   a sealable casing having a loading door for the introduction of refuse, and a lower door for the withdrawal of residues obtained after treatment,
   an upright process cylinder housed in said casing, said process cylinder having an upper part and a lower part,
   a compacting piston in said process cylinder for compacting refuse introduced therein,
   electric resistance heater means energizable for raising the temperature within the process cylinder to a first temperature level such as to vaporize any liquids contained in said refuse and to a second temperature level, lower than said first level, to dry the atmosphere inside said apparatus, and
   extractor means in said housing for removing vapors, gases and fumes generated upon incineration of said refuse, said extractor means being energized as said loading door is opened to maintain the interior of said apparatus under vacuum through the overall operating cycle thereof.

2. An apparatus according to claim 1, wherein said electric resistance heater means is located in the lower part of said process cylinder, and wherein said first temperature level is greater than 500° C. and said second temperature level is of about 100° C.

* * * * *